Figure 1:
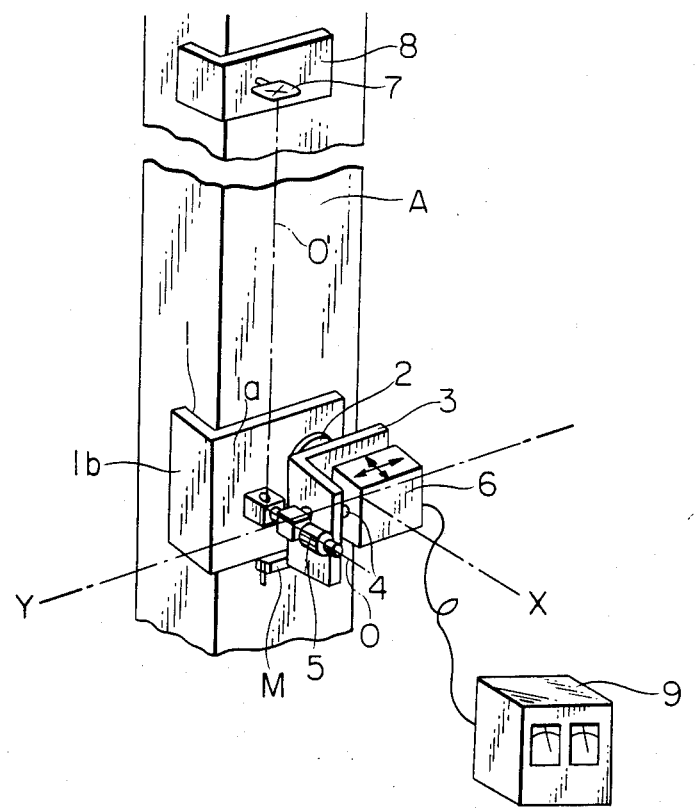

United States Patent [19] [11] Patent Number: 4,621,433
Takeuchi et al. [45] Date of Patent: Nov. 11, 1986

[54] VERTICALITY DETECTING APPARATUS FOR PLUMBING COLUMNS

[75] Inventors: Tetsuya Takeuchi, Kawasaki; Katsuki Koshigoe, Chiba; Hiroshi Ogino, Omiya; Masaharu Hayashi, Hiratsuka, all of Japan

[73] Assignee: Kabushiki Kaisha Sokkisha, Tokyo, Japan

[21] Appl. No.: 651,765

[22] Filed: Sep. 18, 1984

[30] Foreign Application Priority Data

Sep. 19, 1983 [JP] Japan ................... 58-171195

[51] Int. Cl.4 .............................. G01B 11/26
[52] U.S. Cl. ......................... 33/286; 33/290
[58] Field of Search ............. 33/286, 228, 227, 275 R, 33/290, 291, 292, 263, 273, 283

[56] References Cited

U.S. PATENT DOCUMENTS

| 2,088,539 | 7/1937 | Stokenbury | 33/228 |
| 2,136,689 | 11/1938 | Hughes et al. | 33/228 |
| 2,198,836 | 4/1940 | Patton | 33/286 |
| 3,382,754 | 5/1968 | Luden | 33/228 X |
| 4,517,749 | 5/1985 | Scotto | 33/286 |

Primary Examiner—William D. Martin, Jr.
Attorney, Agent, or Firm—Wenderoth, Lind & Ponack

[57] ABSTRACT

A verticality detecting apparatus for plumbing columns has a measuring section to be mounted on a lower end portion of an upper column, an upper target to be mounted on an upper end portion of the upper column and a lower target to be mounted on a lower end portion of a lower column joined to the lower end of the upper column. Inclinations of the measuring section about two orthogonal horizontal axes are adjustable and can be locked at adjusted inclinations. The measuring section consists of a sight telescope with a right angle prism opposed to its objective while placing an edge of the right angle on its optical axis perpendicular thereto, and an inclination sensor for detecting inclinations of the telescope-prism assembly about the two orthogonal horizontal axes. The upper and lower targets are mounted at such positions that the intersection between the edge of the right angle prism and the optical axis of the sight telescope and the upper and lower targets will align on the same straight line when the upper and lower columns are correctly aligned. The inclination sensor issues two zero output signals when the extensions of the optical axis of the sight telescope as reflected by the reflective surfaces of the right angle prism become vertical. These two output signals issued from the inclination sensor are indicated either visually or audibly by means of an indicator electrically coupled to the inclination sensor.

5 Claims, 2 Drawing Figures

VERTICALITY DETECTING APPARATUS FOR PLUMBING COLUMNS

The present invention relates to a verticality detecting apparatus for plumbing columns of a building.

Heretofore, in order to plumb a column, a plumb was suspended from the upper portion of the column to check and adjust the verticality of the column taking a side surface of the column as a reference, or an L-shaped level meter was put on a side surface of the column to check and adjust the verticality.

However, in the former case, if the wind blew, sometimes the plumb moved continuously and did not become still and hence the handling was difficult, and in the latter case there was a shortcoming that if bend was present in the column, determination of the verticality of the column was impossible.

Moreover, when a column is erected on an already erected lower column, generally it is liable to occur that even if the lower column has been correctly plumbed, the verticality of the lower column becomes wrong due to loading by the column erected thereon. Therefore, in the case of erecting a column on an already erected lower column, in addition to plumbing the upper column, it was necessary to check again and, if necessary, readjust the verticality of the lower column, and in the worst case to repeat the plumbing of the upper column. To that end, in the prior art, it was necessitated to set a verticality detecting apparatus on an upper column, nd then on a lower column, and sometimes to reset the verticality detecting apparatus again on the upper column. These were very time-consuming and troublesome operations.

It is therefore one object of the present invention to provide a verticality detecting apparatus for plumbing columns which can simultaneously check and adjust verticalities of upper and lower columns to be plumbed so as to be aligned with each other.

According to one feature of the present invention there is provided a verticality detecting apparatus for plumbing columns comprising a base plate adapted to be mounted on one end portion of a first column, a first horizontal rotary shaft rotatably mounted on the base plate, a support member fixedly secured to the first horizontal rotary shaft, a second horizontal rotary shaft rotatably mounted on the support member perpendicular to the first horizontal rotary shaft, a measuring section fixedly secured to the second horizontal rotary shaft and consisting of a sight telescope with a right angle prism opposed to its objective while placing the edge of the right angle on its optical axis perpendicular thereto and an inclination sensor for detecting inclinations of the telescope-prism assembly about the axes of the first and second horizontal rotary shafts, means for locking the rotations of the first and second horizontal rotary shafts, a first target adapted to be mounted on the other end portion of the first column, and a second target adapted to be mounted on one end portion of a second column, the other end of which is joined to the one end of the first column.

According to the present invention, in the operation of the verticality detecting apparatus, the first and second targets are mounted at such positions that the intersection between the edge of the right angle prism and the optical axis of the sight telescope and the first and second targets will align on the same straight line when the first and second columns are correctly aligned. The inclination sensor issues two output signals respectively representing the inclinations of the telescope-prism assembly about the respective horizontal axes, and the respective output signals are indicated either visually or audibly by means of an indicator electrically coupled to the inclination sensor. Preferably, the inclination sensor should issue two zero output signals when the extensions of the optical axis of the sight telescope as reflected by the reflective surfaces of the right angle prism become vertical. Hence, both the first and second columns can be simultaneously plumbed while observing or listening to the indications of the indicator.

Figure 2:
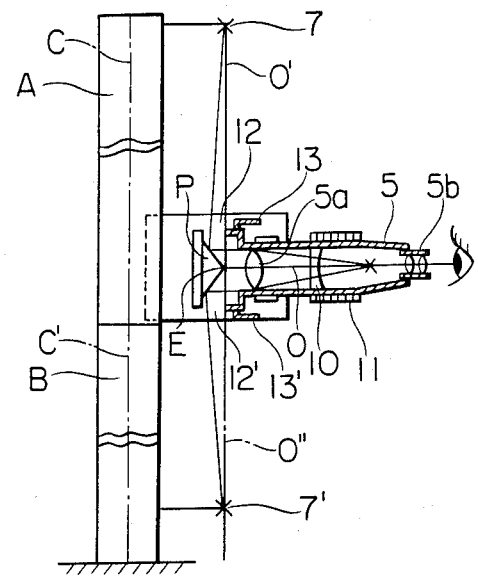

The above-mentioned and other objects, features and advantages of the present invention will become more apparent by reference to the following description of a preferred embodiment of the invention taken in conjunction with the accompanying drawings, wherein:

FIG. 1 is a schematic perspective view showing one preferred embodiment of a verticality detecting apparatus for plumbing columns according to the present invention, and FIG. 2 is a schematic cross-section side view of the same apparatus to be used for explaining the operation principle of the present invention.

Referring now to FIGS. 1 and 2, an L-shaped base plate (1) is fixedly secured on two side surfaces of a lower portion of a column (A) with the aid of a magnet chuck (M). Here it is assumed that the two orthogonal planes (1a) and (1b) of the L-shaped base plate (1) are parallel to a center axis (C) (See FIG. 2) of the column (A). A first horizontal rotary shaft (2) having a center axis (X) is rotatably mounted on the L-shaped base plate (1), an L-shaped support member (3) is fixedly secured to the first horizontal rotary shaft (2), a second horizontal rotary shaft (4) having a center axis (Y) that is perpendicular to the first horizontal rotary shaft (2) is rotatably mounted on the L-shaped support member (3), and the respective horizontal rotary shafts (2) and (4) can be locked at any desired angular positions by locking means not shown. At one end of the second horizontal rotary shaft (4) is fixedly secured a sight telescope (5) with a right angle prism (P) optically aligned with an objective (5a) of the telescope (5) the edge (E) of the right angle surfaces of the prism P being on the optical axis (O) of the telescope (5) and the angled or back surface of the prism being perpendicular thereto. At the other end of the second horizontal rotary shaft (4) is fixedly secured an inclination sensor (6) for detecting inclinations thereof and thus of the telescope-prism assembly about the respective axes (X) and (Y) of the first and secondary rotary shafts (2) and (4). The inclination sensor (6) can be any known type such as an inclination sensor of the differential transformer type or an inclination sensor in which an electrolytic solution is sealed within a glass tube provided with electrodes.

Under the above-described setting condition of the right angle prism (P) and the signt telescope (5), an upper extension (O') of the optical axis (O) of the sight telescope (5) as reflected by the upper reflective surface of the right angle prism (P) and a lower extension (O") of the optical axis (O) as reflected by the lower reflective surface of the right angle prism (P) make an angle of 180° therebetween, that is, align on the same straight line because of the geometrical optics. Furthermore, if the right angle prism (P) is directed with respect to the optical axis (O) in such manner that the respective reflective surfaces of the right angle prism (P) are at an angle of 135° with respect to the optical axis (O), then the straight line on which the extensions (O') and (O'') of the optical axis (O) align, becomes perpendicular to the optical axis (O) of the sight telescope (5). This condition is preferable because the plumbing operation for the columns (A) and (B) (See FIG. 2) can be achieved while maintaining the sight telescope (5) in a horizontal attitude as will be described later. However, this condition is not essentially necessary, because even if the upper and lower reflective surfaces of the right angle prism (P) are at an angle of $(135° + \alpha)$ and an angle of $(135° - \alpha)$, respectively, with respect to the optical axis (O), the same plumbing operation for the columns (A) and (B) can be achieved by inclining the optical axis of the sight telescope (5) by $2\alpha$ above the original horizontal optical axis.

The inclination sensor (6) issues two output signals which respectively represent the inclinations of the sensor (6) and hence the inclinations of the telescope-prism assembly about the respective axes (X) and (Y) of the first and second rotary shafts (2) and (4). Therefore, under the above-described relative orientation of the right angle prism (P) and the sight telescope (5), the two output signals issued from the inclination sensor (6) can be deemed to represent the inclinations of the straight line formed by the extensions (O') and (O'') of an optical axis (O) with respect to the vertical direction about the respective axes (X) and (Y) of the first and second rotary shafts (2) and (4).

The two output signals issued from the inclination sensor (6) are transmitted to an indicator (9) electrically coupled to the inclination sensor (6), and the indicator (9) indicates the respective output signals by visual indications or by signal sounds. For instance, in FIG. 1 the indicator (9) indicates the output signals in the form of swings of pointers on two electric meters.

In the plumbing operation for the column (A), at first the indicator (9) for the inclination sensor (6) is calibrated in such manner that the indicator (9) will present given readings when the extension (O') of the optical axis (O) of the sight telescope (5) extends in the vertical direction. It is preferable to achieve the calibration in such manner that both the indications of inclinations about the axes (X) and (Y) become zero when the extension (O') of the optical axis (O) extends in the vertical direction, and the indication of inclination about each axis (X) or (Y) will present either positive or negative values depending upon on which side the extension (O') of the optical axis (O) inclines. In the case of indicating the output signals of the inclination sensor (6) by means of audible sounds, the inclinations about the axes (X) and (Y) are represented by intensities of sounds of different pitches regardless of the side of inclination. In this case, when the signal sounds of different pitches have both disappeared, the operator can know that the extension (O') of the optical axis (O) has become vertical.

In the second step of the plumbing operation, an L-shaped base plate (8) is mounted on the same side surfaces at an upper portion of the column (A) as the side surfaces on which the L-shaped base plate (1) was mounted, and a first target (7) is fixedly secured on the L-shaped base plate (8) on the same side as the telescope-prism assembly (P,5). On the L-shaped base plate (8), the first target (7) is positioned at such height and lateral position that a straight line connecting the center (marked by a cross) of the target (7) (hereinafter called simply "target") with the intersection between the edge (E) of the right angle prism (P) and the optical axis (O) of the sight telescope (5) will become parallel to the center axis (C) of the column (A).

In the third step of the plumbing operation, while adjusting the inclinations of the telescope-prism assembly by rotating the first and second horizontal rotary shafts (2) and (4), the first target (7) is aimed at by the sight telescope (5), that is, an image of the center of the first target (7) is brought to a cross-point of a cross-wire of the sight telescope (50). Then, it is seen that the extension (O') of the optical axis (O) of the sight telescope (5) is now parallel to the center axis (C) of the column (A). Therefore, at this moment, the rotations of the first and second horizontal rotary shafts (2) and (4) are locked by locking means not shown. Also, at this moment, if reference is made to the indicator (9) which indicates the inclinations of the extension (O') of the optical axis (O), the inclinations of the center axis (C) of the column (A) with respect to the vertical direction about the axes (X) and (Y) can be known.

In the fourth step of the plumbing operation, the column (A) is erected exactly in the vertical direction by means of a crane, a lift or other building machines while checking the inclinations of the center axis (C) of the column (A) by reference to the readings of the inclination indicator (9).

In the case where the column (A) is erected on the top of another column (B) which has been already erected and plumbed as shown in FIG. 2, after the upper column (A) has been erected it may sometimes possibly occur that the verticality of the once plumbed column (B) becomes wrong due to loading by the upper column (A) erected thereon. Therefore, in such a case, upon plumbing the upper column (A) it is desirable that the operator can simultaneously check and adjust the verticalities of both the column (A) and the column (B) without resetting the verticality detecting apparatus on the lower column (B). The verticality detecting apparatus for plumbing columns according to the present invention can achieve such simultaneous plumbing of both the upper column (A) and the lower column (B).

More particularly, the measuring section and the first target (7) of the verticality detecting apparatus are mounted respectively on the lower end portion and the upper end portion of the upper column (A) as described above, and in addition, a second target (7') of the verticality detecting apparatus is mounted on the lower portion of the lower column (B) as shown in FIG. 2.

Like the above-described second step of the plumbing operation for the column (A), the second target (7') is mounted via an L-shaped base plate not shown which is similar to the L-shaped base plate (8), on the same side of the column (B) as the side of the column (A) on which the first target (7) is mounted. The second target (7') is also positioned at such height and lateral position that a straight line connecting the target (7') with the intersection between the edge (E) of the right angle prism (P) and the optical axis (O) of the sight telescope (5) will become parallel to a center axis (C') of the column (B).

Therefore, in the third step of the plumbing operation for the column (B), the second target (7') is aimed at by the sight telescope (5), that is, an image of the center of the second target (7') is brought to a cross-point of a crosswire of the sight telescope (5) while adjusting the inclinations of the telescope-prism assembly by rotating the first and second horizontal rotary shafts (2) and (4). Then, it is seen that the extension (O'') of the optical axis (O) of the sight telescope (5) as reflected by the lower reflective surface of the right angle prism (P) is now parallel to the center axis (C') of the column (B). At this moment, the rotations of the first and second horizontal rotary shafts (2) and (4) are locked by locking means not shown, and by reading the indications by the inclination indicator (9) which now indicates the inclinations of the extension (O") of the optical axis (O), the inclinations of the center axis (C') of the column (B) with respect to the vertical direction about the axes (X) and (Y) can be known.

After zero inclinations have been read on the X-inclination meter and the Y-inclination meter of the inclination indicator (9) as a result of plumbing of the column (A), if it is proved that the inclinations of the column (B) are also zero without necessitating readjustment as a result of the above-described plumbing operation for the column (B), then it is seen that erection of the column (A) on the top of the column (B) has not influenced the verticality of the previously plumbed column (B). Thus the plumbing for the columns (A) and (B) has been completed.

It will be readily seen that at this moment both the images of the centers of the targets (7) and (7') can be seen at the cross-point of the cross-wire of the sight telescope (5) and both readings of the inclination indicator (9) are zero.

On the other hand, after the plumbing for the upper column (A) has been finished, if it is proved that the inclinations of the lower column (B) are not zero as a result of the above-described plumbing operation for the lower column (B), then the verticality of the lower column (B) is readjusted by means of a crane, a lift or other building machines while checking the inclinations of the center axis (C') of the column (B) by reference to the readings of the inclination indicator (9). And then, the verticality of the upper column (A) is again checked and adjusted, and eventually the plumbing for both the upper column (A) and the lower column (B) can be completed. That is, both the upper column (A) and the lower column (B) can be erected exactly in the vertical direction.

Especially, it is to be noted that according to the present invention, once the measuring section, the first target (7) and the second target (7') have been set at the above-described positions on the upper column (A) and the lower column (B), the repeated plumbing operations for the column (A) and for the column (B) can be easily achieved without the necessity to reset the measuring section and the first and second targets (7) and (7').

It will be obvious that while the measuring section is mounted on the lower end portion of the upper column (A) in the above-described embodiment, similar plumbing operations for the upper column (A) and the lower column (B) can be achieved even if the measuring section is mounted on the upper end portion of the lower column (B), provided that the firt and second targets (7) and (7') are mounted on the upper end portion of the upper column (A) and on eht lower end portion of the lower column (B).

Further referring to FIG. 2, preferably the sight telescope (5) includes a focusing lens (10) between the objective (5a) and an eye-piece (5b) so that an image of the target (7) or (7') placed at any distance along the vertical columns can be focused on the plane of the crosswire by displacing the focusing lens (10) via a focusing knob (11). Then, no limitation is imposed on the vertical distance between the target (7) or (7') and the measuring section. Therefore, the above-described simultaneous plumbing is not limited to two columns joined one on the other, but simultaneous plumbing can be achieved for any number of vertically joined columns and another column to be erected on the top of the series of columns. In this case, the measuring section could be mounted on the lower end portion of the uppermost column, and the targets (7) and (7') could be mounted on the upper end portion of the uppermost column and on the lower end portion of the lowermost column.

Also, with reference to FIG. 2, optical apertures (12) and (12') in the top and bottom walls of a frame containing the right angle prism (P) therein are provided with shutters (13) and (13'), respectively, which can be manually opened and closed for portection of the optical surfaces of the prism (P).

While the present invention has been described above in connection to one preferred embodiment thereof, it is intended that as a matter of course, the present invention should not be limited to the illustrated embodiment but various changes and modifications in design could be made without departing from the spirit of the present invention.

What is claimed is:

1. A verticality detecting apparatus for plumbing columns comprising: a base plate adapted to be mounted on one end portion of a first column; an assembly having a first horizontal rotary shaft rotatably mounted on said base plate, a support member fixedly secured to said first horizontal rotary shaft, a second horizontal rotary shaft rotatably mounted on said support member perpendicular to said first horizontal rotary shaft, and a measuring section fixedly secured to said second horizontal rotary shaft and consisting of a sight telescope having a right angle prism optically aligned with the objective thereof with the edge between the right angle faces of said prism on the optical axis and the angled face perpendicular thereto; an inclination sensor on said assembly for detecting inclinations of said assembly about the axes of said first and second horizontal rotary shafts; means for locking said first and second horizontal rotary shafts against rotation; a first target adapted to be mounted on the other end portion of said first column; and a second target adapted to be mounted on one end portion of a second column, the other end of which is joined to said one end of said first column.

2. A verticality detecting apparatus for plumbing columns as claimed in claim 1, in which the faces of said right angle prism forming a right angle therebetween respectively are at an angle of 135° with respect to the optical axis of said sight telescope.

3. A verticality detecting apparatus for plumbing columns as claimed in claim 1, in which said inclination sensor issues two zero output signals when the extensions of the optical axis of said sight telescope as reflected by the faces of said right angle prism become vertical.

4. A verticality detecting apparatus for plumbing columns as claimed in claim 1, further comprising an inclination indicator electrically coupled to said inclination sensor for indicating output signals issued from said inclination sensor either visibly or audibly.

5. A verticality detecting apparatus for plumbing columns comprising a measuring section adapted to be mounted on one end portion of a first column so as to be rotatable about two orthogonal horizontal axes, a first target adapted to be mounted on the other end portion of said first column, a second target adapted to be mounted on one end portion of a second column the other end of which is joined to said one end of said first column, and means for locking the rotations of said measuring section about said two orthogonal horizontal axes, said measuring section having a sight telescope having a right angle prism optically aligned with the objective thereof with the edge between the right angle faces of said prism on the optical axis and the angled face perpendicular thereto, and an inclination sensor on said measuring section for detecting inclinations of the measuring section about said two orthogonal horizontal axes.

* * * * *